Patented Oct. 24, 1950

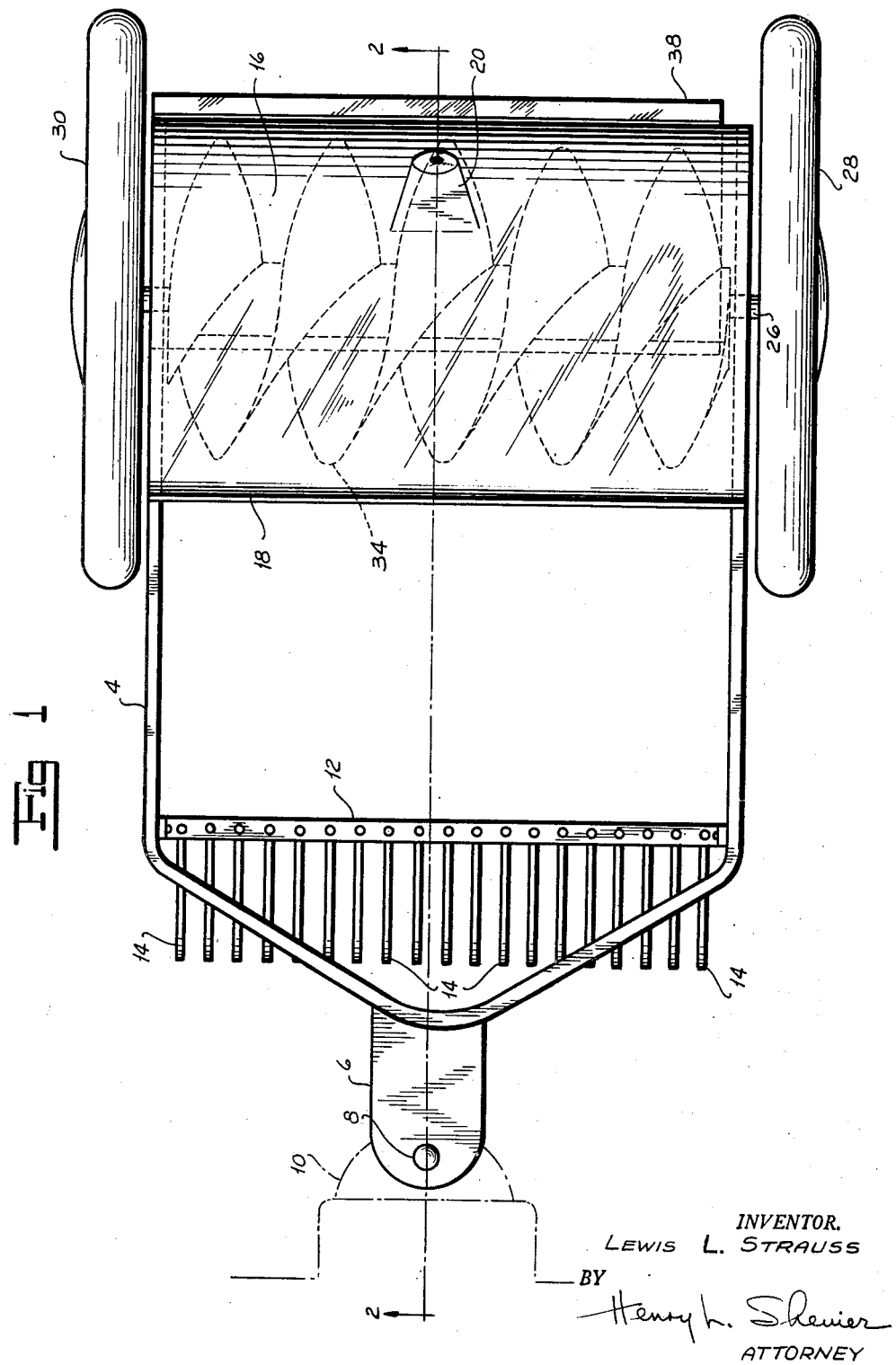

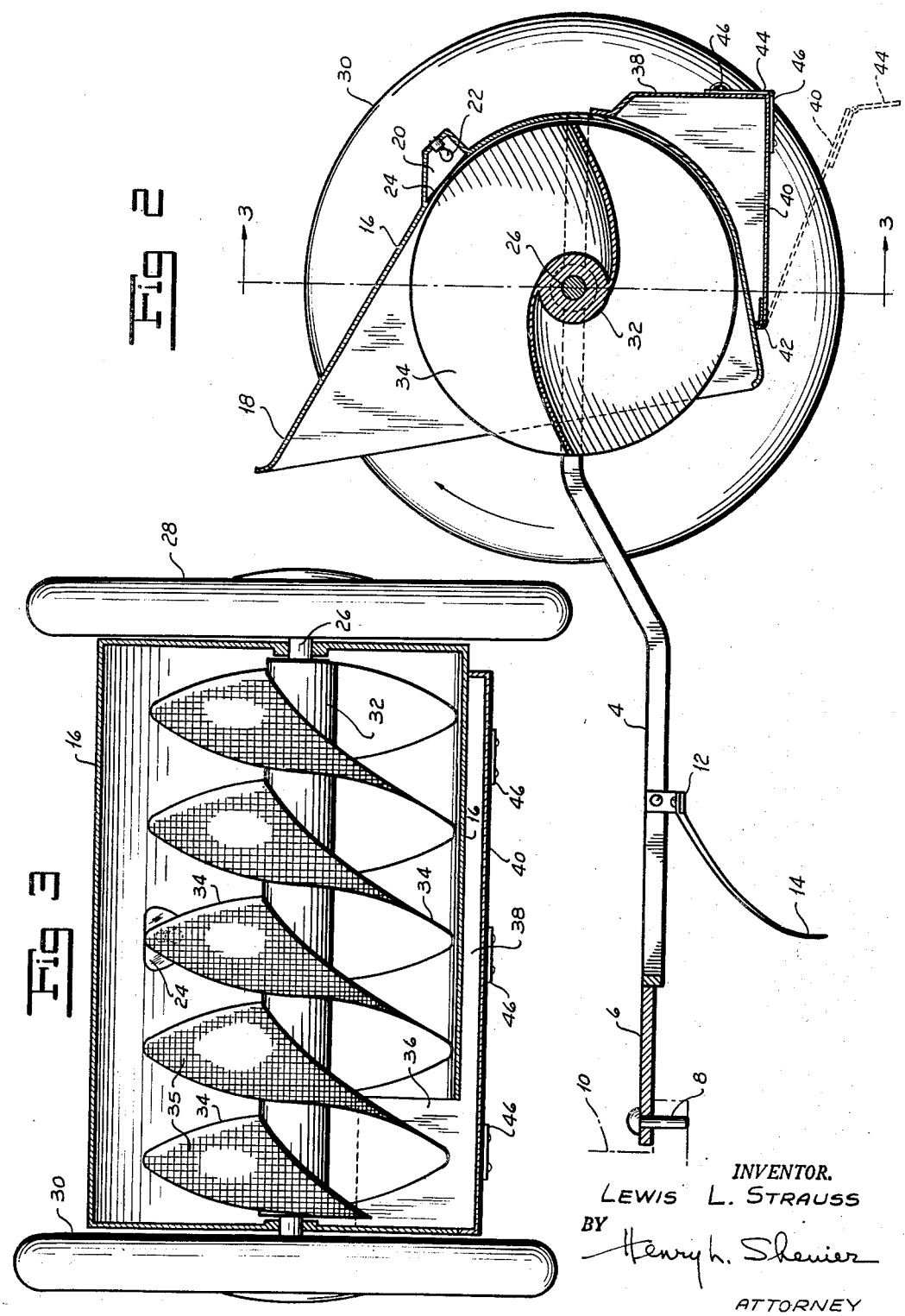

2,526,781

UNITED STATES PATENT OFFICE 2,526,781

INSECT HARVESTER

Lewis L. Strauss, New York, N. Y.

Application February 28, 1947, Serial No. 731,621

3 Claims. (Cl. 43—138)

My invention relates to insect harvesters and more particularly to an apparatus for rapidly, conveniently and expeditiously collecting insects in open fields, pastures or the like.

Heretofore insects have been considered a nuisance, crop destroyers and pests and no use has been made of them. It is well known, furthermore, that the insect life in American fields and pastures is quite extensive. I have found that insects average about 83 per cent by dry weight protein content. It is possible by means of suitable extraction processes to remove the chitinous, keratinous and other covering matter and components of the wings, legs and thoraces of insects in order to separate this material from the protein. The chitinous material, furthermore, may be dissolved in suitable solvents by methods which form no part of the instant invention to produce useful plastic material.

The protein recovered is valuable for use as an animal, stock and poultry feed and provides a heretofore untapped source of valuable proteins.

One object of my invention is to provide an inexpensive, simple harvester whereby insects may be harvested for subsequent treatment to recover valuable components.

Another object of my invention is to provide a harvester which is sturdy and simple to operate.

Another object of my invention is to provide a harvester which has a single moving part and which may be propelled through a field or pasture in order to harvest insects.

Other and further objects of my invention will appear from the following description.

In the accompanying drawings which form part of the instant specification and which are to be read in conjunction therewith and in which like reference numerals are used to indicate like parts in the various views:

Figure 1 is a top plan view of an insect harvester showing one embodiment of my invention.

Figure 2 is a sectional view taken on the line 2—2 of Figure 1.

Figure 3 is a sectional view taken on the line 3—3 of Figure 2.

In general my invention contemplates a shield carried by a frame adapted to be pushed in front of a propelling vehicle of any appropriate type. Between the propelling vehicle and the shield I provide a plurality of spring teeth to form a rake adapted to disturb the insects. As the insects fly forwardly to escape the oncoming vehicle, they are caught by the shield. Positioned within the shield is an auger driven by the ground wheels supporting the front end of my harvester. The auger is adapted to propel the insects into a collecting receptacle carried beneath the shield. Means are provided for rapidly and simply emptying the collecting receptacle to recover the insects harvested.

More particularly, referring now to the drawings, a frame 4 made of any appropriate material is formed with a rearwardly disposed tongue 6 provided with a pin 8 adapted to couple the frame to the front end of a propelling vehicle 10. The propelling vehicle may be a tractor, an automobile or any other similar self-propelled vehicle which may be driven through a pasture or a field in which the insects to be harvested are resting. A cross bar 12 extends athwart the frame and carries a plurality of spring teeth 14 which are adapted to contact the ground or pass closely adjacent thereto in order to disturb the insects. A housing 16 is carried by the frame 4 and secured thereto in any appropriate manner. The housing is formed with a forwardly extending upper wall 18 adapted to extend across the path of insects flying or leaping upwardly to escape. If desired, the housing may be made of transparent plastic material. It may be made, of course, out of any appropriate material such as aluminum, magnesium or sheet metal of any desired type. The upper wall 18 may if desired be formed of fabric disposed over a supporting frame of any suitable construction and may extend upwardly and rearwardly for any appropriate distance. The housing is formed with a compartment 20 in which I position an incandescent lamp 22. The compartment 20 is covered by a transparent plate 24 so that the light from the incandescent lamp 22 will be visible in the rearward direction. The light will attract insects at night and cause them to fly into the housing thus enabling my harvester to be efficiently employed at night. The housing and the forward end of the frame 4 are supported by a shaft 26 to which ground wheels 28 and 30 are secured. The shaft 26 is keyed to the wheels 28 and 30 for rotation therewith. If desired, anti-friction bearings of any suitable type may be provided. The structure, however, is so light that simple bushings lubricated as known to the art are satisfactory. The shaft 26 carries an elongated hub 32 which is secured to the shaft 26 for rotation therewith. Formed with the hub 32 is an auger or Archimedean screw 34. The auger may be formed of plastic material which is reinforced by a fabric or wire mesh 35 as can be seen by reference to Figure 3. If desired, the auger may be formed of aluminum, magnesium or any other appropriate light sheet metal. A portion of the housing 16 is removed at 36 adjacent the lower left-hand side thereof as viewed in Figure 3. Carried underneath the housing 16 and secured thereto in any appropriate manner, I provide a collecting receptacle 38 so that insects pushed through the opening 36 in the housing will be deposited in the receptacle. The bottom of the receptacle 40 is hinged at its after end by hinges 42 and is normally held in the position shown in Figure 2 by means of a forward flap 44 adapted to be secured by hasps 46 or in any other suitable, readily releasable manner. The flap 44 is hingedly connected to the bottom 40 by means of hinge members 46. By dropping the bottom of the collecting receptacle, insects which have been deposited therein may be quickly collected in suitable bags or other containers for transportation to the processing depot.

In use, my harvester is attached to the forward end of a self-propelled vehicle 10 by means of connecting pin 8. The direction of travel of the harvester is easily controlled by the propelling vehicle in a manner similar to the directing of a trailer when it is being backed. The ground wheels, which may be of any appropriate construction, are sufficiently large in diameter so that the front end of the collecting receptacle 38 is well above the ground so that the insects to be harvested, such as grasshoppers, crickets, locusts, beetles, flies, wasps, hornets, bugs and the like, will not be prematurely disturbed. As the spring teeth 14 disturb the insects, they fly or leap upwardly away from the oncoming propelling vehicle in order to escape and are caught by the shield 18. The inclination of the shield which forms the forward upper portion of the housing 16 is such that the insects are directed into the path of the auger 34. The auger is being revolved by the rotation of the shaft 26 so as to move the insects to the left as viewed in Figure 3. As the insects are directed to the opening 36 they pass into the container 38. The opening 36 is visible from the position of the operator of the propelling vehicle. When it is observed that the collecting receptacle is full, it may be emptied and the operation continued. At night the incandescent lamp 22 is employed in order to attract insects into the path of the revolving auger 34.

While I have shown the auger driven from the shaft directly for reasons of simplicity and cheapness it is to be understood that any suitable means for driving the auger may be employed.

These refinements, however, are not necessary since the speed of operation is usually sufficient to collect the insects and pass them through the opening 36.

It is to be understood, furthermore, that a wider swath may be harvested by using a large inter-wheel dimension depending upon the terrain over which the harvester is to be used.

It will be seen that I have accomplished the objects of my invention. I have provided an inexpensive, light, sturdy and simple insect harvester which has few moving parts and by which I am enabled to collect insects to be processed for the recovery of proteins and other valuable by-products.

It will be understood that certain features and sub-combinations are of utility and may be employed without reference to other features and sub-combinations. This is contemplated by and is within the scope of my claims. It is further obvious that various changes may be made in details within the scope of my claims without departing from the spirit of my invention. It is therefore understood that my invention is not to be limited to the specific details shown and described.

Having thus described my invention, I claim:

1. An insect harvester, including in combination a frame, a shaft journaled in said frame, a pair of ground wheels carried by said shaft, a housing carried by said frame, said housing being formed with an open rearwardly directed portion, insect disturbing means carried by said frame rearwardly of said housing, an auger disposed in said housing, means for rotating said auger from said shaft, a collecting receptacle, and means providing communication between said receptacle and said housing.

2. An insect harvester, including in combination a frame, means for connecting said frame to a propelling vehicle adjacent one end thereof, a shaft carried by said frame adjacent the other end thereof, ground wheels attached to said shaft for rotation therewith, a housing carried by said frame formed with a portion open rearwardly directed in the direction of said connecting means, an auger disposed within said housing and carried by said shaft for rotation therewith, a collecting receptacle, means providing communication between said housing and said collecting receptacle and insect disturbing means carried by said frame between said connecting means and said housing.

3. An insect harvester including in combination a frame, means for connecting the after-portion of said frame to a propelling vehicle, means for journaling a shaft in said frame adjacent the forward portion thereof, ground wheels carried by said shaft and secured thereto for rotation therewith, a housing supported by said frame, said housing being formed with an open rearwardly directed portion in the direction of said connecting means, an auger positioned within said housing for rotation therein, means for rotating said auger from said shaft, a collecting receptacle, means for providing communication between said housing and said collecting receptacle, and insect disturbing means carried by said frame between said connecting means and said housing.

LEWIS L. STRAUSS.

REFERENCES CITED

The following references are of record in the file of this patent:

UNITED STATES PATENTS

| Number | Name | Date |
|---|---|---|
| 187,855 | Hoos | Feb. 27, 1877 |
| 566,099 | Shely | Aug. 18, 1896 |
| 738,184 | Goodwin | Sept. 8, 1903 |
| 740,063 | Thompson | Sept. 29, 1903 |
| 1,811,324 | Lockard | June 23, 1931 |